United States Patent [19]

Thorne

[11] Patent Number: 4,896,345
[45] Date of Patent: Jan. 23, 1990

[54] CALL HANDLING SYSTEM

[76] Inventor: Donald J. Thorne, 858 Westgrove Rd., Akron, Ohio 44303

[21] Appl. No.: 311,469

[22] Filed: Feb. 16, 1989

[51] Int. Cl.[4] .............................................. H04M 3/50
[52] U.S. Cl. ....................................... 379/67; 379/84; 379/214; 379/266
[58] Field of Search ....................... 379/67, 84, 88, 266, 379/309, 214, 265

[56] References Cited

U.S. PATENT DOCUMENTS

| | | | |
|---|---|---|---|
| 4,338,494 | 7/1982 | Theis | 379/93 X |
| 4,400,587 | 8/1983 | Taylor et al. | 379/266 X |
| 4,430,726 | 2/1984 | Kasday | 364/900 |
| 4,620,066 | 10/1986 | Bushnell et al. | 379/113 |
| 4,800,583 | 1/1989 | Theis | 379/67 |

Primary Examiner—Thomas W. Brown
Attorney, Agent, or Firm—Renner, Kenner, Greive, Bobak, Taylor & Weber

[57] ABSTRACT

A call handling system is presented in which an assembly of operators are provided to efficiently handle incoming calls. A first array of operators solely handle incoming calls. A second array of operators are provided to handle incoming calls and to periodically return calls from messages which were recorded during peak times when all operators were busy and incoming calls continued. A microprocessor monitors the recorded messages and, when a predetermined number have accumulated, directs one of the operators to transcribe the messages into memory in the microprocessor. At this point in time, the microprocessor avails itself of certain operators who are capable of handling both incoming and outgoing calls, places the return call, and interconnects the operator with such return call.

10 Claims, 1 Drawing Sheet

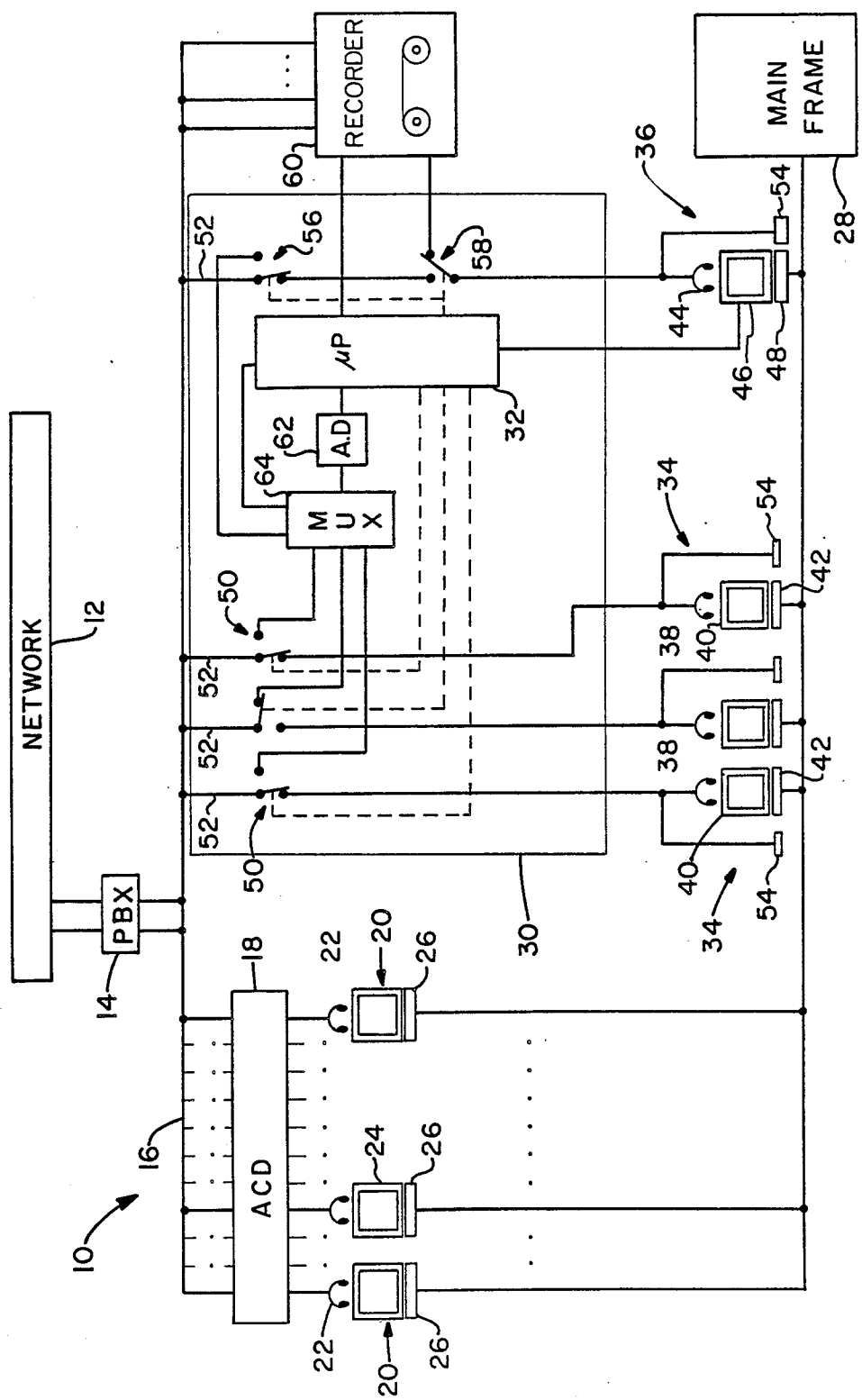

CALL HANDLING SYSTEM

TECHNICAL FIELD

The invention herein resides in the art of telecommunications and, more particularly, to a system for receiving and handling a large number of incoming telephone calls for business transactions or the like. More particularly, the invention relates to such a system which is capable of quickly and efficiently returning telephone calls in the event that all operators were busy when the incoming call was placed.

BACKGROUND ART

It is well known that many businesses such as airlines, automobile clubs, and credit card agencies handle large volumes of incoming calls. The callers are typically funneled through an automatic call director to anyone of a large number of operators who assist the caller in resolving a problem, placing an order, obtaining information on an account, and the like. Associated with each operator is a fixed level of cost for wages, benefits, and support equipment. Accordingly, it is most desirable that the number of such operators be held to the minimum number necessary for properly servicing the public. In known systems, when incoming calls are received and there are no operators available to deal with the caller, the caller is often placed on "hold," awaiting the availability of an operator. In such systems, however, the caller or patron is often frustrated by the long wait and may terminate the call by simply hanging up. In such a case, the desired transaction may never be completed, hurting both the patron and the business establishment.

It has been known to include recording devices in association with such systems to allow the caller to leave his name, account number, and phone number for a return call. In such known systems, the recording device is typically accessed two or three times a day, at which times the return calls are attempted. However, often the interested party is no longer available at that phone number, impeding further efforts at contact.

In light of the foregoing, there is a need in the art for a call handling system which allows for the expeditious making of return calls, while maximizing the efficiency and effectiveness of all operators and equipment employed in the system.

DISCLOSURE OF INVENTION

In light of the foregoing, it is a first aspect of the invention to provide a call handling system in which a designated operator is provided for continually monitoring a recording device to assure that a prompt return of unsuccessful incoming calls is made.

Another aspect of the invention is the provision of a call handling system in which a number of designated operators can efficiently and economically handle both incoming and outgoing return calls.

Still a further aspect of the invention is the provision of a call handling system in which provisions for automatically returning unsuccessful incoming calls may be efficiently and economically combined with present systems adapted for handling incoming calls.

Yet a further aspect of the invention is the provision of a call handling system in which a return call may be made in a time frame sufficient to assure that the call originator is at the phone number left on a recording device.

The foregoing and other aspects of the invention which will become apparent as the detailed description proceeds are achieved by a telephonic call handling system for interconnection with a public telephone network, comprising: a first plurality of operator stations operatively connected to the public telephone network for receiving incoming calls therefrom; a second plurality of operator stations operatively connected to the public telephone network for receiving incoming calls therefrom, and placing outgoing calls thereon; first switch means interconnected between said second plurality of operator stations and the public telephone network for selectively enabling said second plurality of operator stations to receive incoming calls and place outgoing calls; and control means operatively connected to said switch means for selectively actuating said first switch means.

DESCRIPTION OF DRAWING

For a complete understanding the objects, techniques and structure of the invention, reference should be had to the following detailed description and accompanying drawing wherein:

A schematic block diagram of the call handling system of the invention is shown.

BEST MODE FOR CARRYING OUT THE INVENTION

Referring now to the drawing, it can be seen that a call handling system according to the invention is designated generally by the numeral 10. The system 10 is adapted for interconnection with a telephone network 12, comprising the telephone lines and public or private exchange systems which allow for telecommunications between various establishments. It is contemplated that the invention will include a private business exchange (PBX) system 14, located at the establishment utilizing the system 10. As is set forth above, such an establishment would be of the nature typically handling a large volume of incoming calls, such as credit card agencies, airlines, automobile clubs, and the like. The PBX system 14 communicates with a bus 16 for handling the incoming calls received from the network 12. According to the invention, the PBX system 14 will pass the incoming calls along the bus 16 to an automatic call director 18. As is known in the art, and automatic call director multiplexes a plurality of incoming lines to a plurality of operator stations 20, seeking those stations which have an operator available for handling the call.

It will be understood that the system 10 will typically include a large number of operator stations 20, as high as 50 such stations, while only three such stations are shown in the drawing. Each of the operator stations 20 includes a headset 22 for sending and receiving voice communications. Such a headset 22 would be worn by an operator and include both earphones and a mouth piece. Also associated with each such operator is a Cathode Ray Tube or screen 24 for receiving visual communications. Finally, a keyboard 26 is also provided at each of the operator stations 20 for allowing the entry of data, commands, and requests.

The screens 24 and keyboards 26 allow each of the operators at the respective stations 20 to communicate with a mainframe computer 28 which maintains records and files of cardholders, information on customers, ticket information for airlines, and the like. An operator at a station 20 may access the mainframe computer 28 via the keyboard 26 to obtain account information, make flight reservations, execute transactions, enter data, and the like.

The automatic call director 18 functions to pass incoming calls from the bus 16 to one of the operator stations 20, so long as there is an available operator at such a station. When all of the operators at the stations 20 are busy handling incoming calls, the overflow of calls may be transferred to a telephonic input/output (I/0) system 30, receiving incoming lines from the PBX system 14 over the bus 16. It is, of course, contemplated that the system 30 may receive incoming lines from the automatic call director 18, or directly from the network 12. A microprocessor 32 is provided within the telephonic I/0 system 30 for controlling the operation thereof in a manner to be described hereinafter. Associated with the system 30 is a plurality of operator stations 34, of substantially identical nature, and an operator station 36, of a slightly different nature which will be discussed hereinafter.

Each of the operator stations 34 is adapted to service a single operator and includes a headset 38 for making audio communications as discussed above. There is also provided a screen 40 for receiving visual data and information from the mainframe computer 28, and a keyboard 42 for transmitting and sending data thereto. The operator station 36 also includes a headset 44 and a video screen 46. The screen 46, however, is a split screen, the top half of which communicates with the microprocessor 32, while the bottom half communicates with the mainframe computer 28. A keyboard 48 is also provided to allow the associated operator to enter data, commands, or requests to either the microprocessor 32 or mainframe computer 28.

As shown in the drawing, each of the operator stations 34 is capable of taking an incoming call over an associated line 52 through the PBX system 14 and bus 16. This is accomplished by appropriate switching of an associated switch 50 under control of the microprocessor 32. As shown in the drawing, the outermost operator stations 34 are connected by their associated switch 50 to an incoming line 52. In such an instance, the operators at the stations 34 function in the same manner as the operators at the stations 20, handling incoming requests for services, information, or transactions. As shown, the switches 50 may also be actuated under control of the microprocessor 32 to interconnect the associated line 52 with the microprocessor 32, automatic dialer 62, and multiplexer 64 for the placement of return outgoing calls in a manner to be discussed later. The switch 50 of the middle operating station 34 is shown in the position for dialing a return call. After the dialing is completed, the switch 50 of the middle station 34 is activated by the microprocessor 32 to interconnect the line 52 with the station 34 for communication with the called person.

It will also be seen that the operator station 36 is provided with a switch 56 which, under control of the microprocessor 32, is capable of allowing the station 36 to communicate with incoming lines 52 through the PBX system 14, or to return calls as discussed above with respect to the switches 50. The operator station 36 is also provided with a second switch 58 which is operative under control of the microprocessor 32 to interconnect the operator at the station 36 with a recorder 60. The purpose of such recorder will be discussed directly below.

In the event that there are no operators available at the stations 20, 34, 36 to handle incoming calls from the PBX system 14, such system will then channel the incoming calls to a voice recorder 60. The recorder 60, as is well known in the art, will answer the call with a recorded message advising the caller that there are no available operators and requesting that the caller leave certain pertinent information such as his name, telephone number, and account number. The microprocessor 32 monitors the receipt of such calls by the recorder 60 and, when a predetermined number of such calls, such as 6 or so, have been received, the microprocessor 32 will indicate such condition on the top half of the screen 46 at the station 36 or audibly through the headset 44. The operator at the station 36 is thus advised that the messages on the recorder 60 should be transcribed so that return calls can be made. Immediately upon completion of any task in which the operator at the station 36 is employed when the message shows on the screen 46, the operator advises the microprocessor 32 via the keyboard 48 that he is available for receiving messages from the recorder 60. The microprocessor 32 then actuates the switch 58 to the position shown in the drawing, interconnecting the recorder 60 with the headset 44. The microprocessor then actuates the recorder 60 to play back the recorded messages. The operator at the station 36 then transcribes the information from the recorder 60 into a memory position in the microprocessor 32 by means of the keyboard 48. When the totality of the transcription is completed, the microprocessor 32 is advised via the keyboard 48 and the switch 58 is actuated to interconnect the station 36 with the switch 56.

It is contemplated as a part of the invention that the system 30 be substantially autonomous with respect to the remainder of the structure 10 and the mainframe computer 28. The screens 40 and keyboards 42 preferably communicate only with the mainframe computer 28. Only the split screen 46 and keyboard 48 are contemplated as being communicative with both the mainframe computer 28 and the microprocessor 32. Preferably, operators at the stations 34 receive audible signals or communications from the microprocessor 32 through the headsets 38, and transmit data to the microprocessor 32 by means of associated touch tone pads 54. Indeed, it is contemplated that intercommunication between the station 36 and the microprocessor 32 may similarly be achieved by the headset 44 and touch tone pad 54, eliminating the need of the split screen 46.

With a listing of required return calls in its memory, the microprocessor 32 awaits indications via the touch tone pads 54 that operators at the stations 34, 36 are available to make return calls. When so advised, the microprocessor 30 switches the appropriate switch 50, 56 of the available operator to a position to access a line 52 for making a return call. Such a position is shown at the mid station 34. At this time, the microprocessor 32 sends the first phone number for a return call through an automatic dialer 62 to a multiplexer 64. The multiplexer 64 is advised by the microprocessor 32 to access the available operator. With this switching completed, the phone number is automatically dialed by means of the automatic dialer 62 through the multiplexer 64, switch 50 and line 52. When the phone begins to ring, the switch 50 or 56 is actuated to connect the operator station 34 or 36 with the line 52. When the phone is answered, the operator at the station 34 or 36 indicates that a return call is being made on behalf of the named establishment. The transaction then proceeds in the same manner as if the individual called had originated the call himself.

It is also contemplated as a part of the invention that the recorded message from the recorder 60 is played through the multiplexer 64 to the headphones of the operator who will handle the return call while the phone number is being dialed. In this manner, the operator may enter the name, account number, and other information onto the associated screen 40, 46 and make access to the mainframe computer 28 to be immediately ready to commence communication when the phone is answered at the other end. It is further contemplated that such information may be digitally transmitted from the memory of the microprocessor 32 to the upper portion of the screen 46 directly from the microprocessor 32. Such information, entered from the keyboard 48 into the mainframe computer 28, may also be transmitted therefrom to the screens 40. Obviously, the information can be more rapidly transmitted in this manner than by the playing of the recording through the associated headset.

Once all of the selected return phone calls have been made, the switches 50, 56 of all of the stations 34, 36 are switched to the lines 52 to receive incoming calls from the PBX system 14. When an overloaded situation again occurs, the recorder 60 takes down the messages until a predetermined number are recorded and the sequence repeats.

It should now be apparent to those skilled in the art that the invention allows certain operators in a bank of operators to function in a dual mode, handling incoming calls from a PBX system, while periodically handling return calls. These return calls are made in quick fashion, since only a limited number are allowed to accumulate before return calls are commenced. In this manner, it is virtually assured that the caller will be at the telephone when the return call is made.

It is also contemplated as a part of the invention that the microprocessor 32 may advise the stations 34, 36, by audible message via the headsets 38, 44, that return calls are needed to be made such that the operators at these stations can, upon completion of their immediate tasks, await the receipt of the return calls.

It should further be understood by those skilled in the art that the recorder 60 may receive either voice communication, or digital audio signals from "touch tone" phones. Messages left in digitized form by such callers would require no transcription by the operator at station 36, but may be transcribed directly to the microprocessor 32 on command. It will, of course, be understood that the microprocessor 32 may be programmed to directly receive such touch tone messages without the intermediary of the recorder 60.

Thus it can be seen that the objects of the invention have been satisfied by the structure presented hereinabove. Utilization of the operators and their associated equipment is optimized and patron frustration is minimized. Return calls are promptly made such that desired transactions can be accomplished with a minimum of delay. By prioritizing the incoming calls such that they are initially directed to the operators at the stations 20 if any are available, the operators at the stations 34, 36 are left available to handle return calls on an evenly distributed basis. Only at peak load times do the operators at the stations 34, 36 function as the operators at the stations 20 to handle incoming calls.

It can further be seen that the system 30, capable of handling both incoming and return calls, is readily adapted for implementation with existing systems for receiving, distributing, and handling incoming calls. The system 30 is substantially self-contained and can function equally well with or without an interface with the mainframe computer 28.

While in accordance with the patent statutes, only the best mode and preferred embodiment of the invention has been presented and described in detail, it is to be understood that the invention is not limited thereto or thereby. Accordingly, for an appreciation of the true scope and breadth of the invention, reference should be had to the following claims.

What is claimed is:

1. A telephone call handling system for interconnection with a telephone network, comprising:
   a first plurality of operator stations operatively connected to the telephone network for receiving incoming calls therefrom;
   a second plurality of operator stations operatively connected gto the telephone network for receiving incoming calls therefrom, and placing outgoing calls thereon;
   first switch means interconnected between said second plurality of operator stations and the telephone network for selectively enabling said second plurality of operator stations to receive incoming calls and place outgoing calls;
   control means operatively connected to said switch means for selectively actuating said first switch means;
   call distribution means interposed between the telephone network and said first and second plurality of operator stations for selectively distributing said incoming calls to various of said first and second plurality of operator stations, said call distribution means distributing calls first to operator stations of said first plurality and thence to operator stations of said second plurality in the event that all operator stations in said first plurality are in receipt of an incoming call; and
   recording means interconnected with said call distribution means, said recording means receiving nd recording information from incoming calls when all operator stations of said first and second plurality are connected to calls.

2. The telephonic call handling system according to claim 1, further comprising means for returning such calls as are recorded by said recording means.

3. The telephonic call handling system according to claim 2, wherein said means for returning calls comprises an automatic dialer.

4. The telephonic call handling system according to claim 2, further comprising communication means between said second plurality of operator stations and said control means for indicating when return calls can be made.

5. The telephonic call handling system according to claim 4, wherein said communication means comprises means associated with each of said second plurality of operator stations for indicating to said control means that said operator station is available for making a return call, and means associated with said control means for indicating to said second plurality of operator stations that return calls are available for making.

6. The telephonic call handling system according to claim 1, wherein one of said second plurality of operator stations is interconnected with said recording means by second switch means for selectively interconnecting said recording means with said one of said second plurality of operator stations.

7. The telephonic call handling system according to claim 6, wherein said one of said second plurality of operator stations comprises transcription means for transcribing said recorded information from said recording means to said control means.

8. The telephonic call handling system according to claim 7, wherein said recorded information comprises a telephone number for making a return call, and said control means includes means for accessing a telephone via said telephone number and interconnecting said telephone with one of said second plurality of operator stations.

9. The telephonic call handling system according to claim 8, wherein each of said first and second plurality of operator stations comprises a video screen and keyboard in communication with a computer.

10. The telephonic call handling system according to claim 9, wherein said one of said second plurality of operator stations comprises a keyboard nd a split video screen, a first portion of said video screen communicating with said computer, and a second portion of said video screen communicating with said control means.

* * * * *